Dec. 21, 1965 K. MAICHEN 3,224,285
INFINITELY VARIABLE FRICTION GEARING
Filed April 29, 1963 3 Sheets-Sheet 1

INVENTOR.
KARL MAICHEN
BY
ATTORNEYS

INVENTOR.
KARL MAICHEN
BY
ATTORNEYS

Dec. 21, 1965    K. MAICHEN    3,224,285
INFINITELY VARIABLE FRICTION GEARING
Filed April 29, 1963    3 Sheets-Sheet 3

INVENTOR.
KARL MAICHEN
BY
*Inniex Smiley*
ATTORNEYS

United States Patent Office 3,224,285
Patented Dec. 21, 1965

3,224,285
INFINITELY VARIABLE FRICTION GEARING
Karl Maichen, Lauterach 269, Austria
Filed Apr. 29, 1963, Ser. No. 276,445
Claims priority, application Austria, Apr. 30, 1962,
A 3,508/62; Nov. 29, 1962, A 9,363/62
6 Claims. (Cl. 74—192)

This invention relates to an infinitely variable friction gearing, comprising transmitting elements in the form of conical members and friction rings interconnecting said conical members. The special design of the friction gearing according to the invention affords the advantage that the high friction caused in the known gearings by the velocity differences occurring at the line of contact of two conical members in rolling contact with each other and resulting in a wear of the rolling surfaces is much reduced.

The invention provides an infinitely variable friction gearing comprising a rotary driving shaft having at least one substantially conical rotor rotating with the shaft, a rotating driven shaft having also at least one substantially conical rotor rotating with it, said rotor on the driving shaft tapering in a direction opposite to the taper of the rotor on the driven shaft, both rotors being operatively connected by an endless rolling contact member surrounding them, means for adjusting said rolling contact member in mutually opposite directions for changing the speed, means for forcing said rotors against said rolling contact member, at least one of said rotors having straight generatrices.

Another feature of the invention resides in that a plurality of conical rotors are provided on each of the driving and driven sides and each conical member on the driving side is connected by a rolling contact member to a corresponding rotor on the driven side.

Another feature of the invention is that the rolling contact member consists as a rolling contact ring.

Finally, it is a feature of the invention that the rolling contact rings are mounted at two mutually opposite points between rolls, which support the rings on both sides and are carried by arms of a lifting gear.

Figure 1:
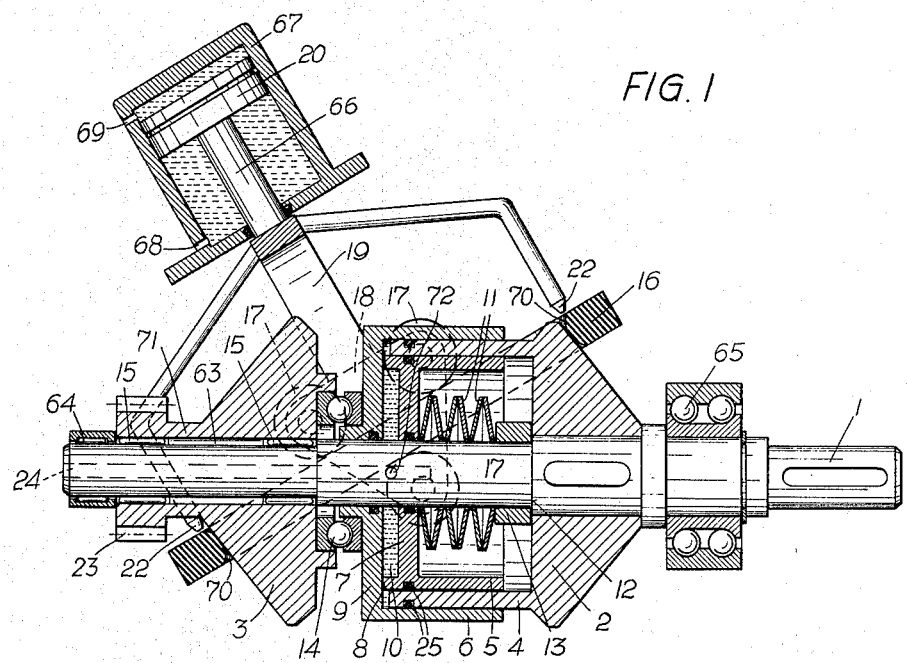
Figure 2:
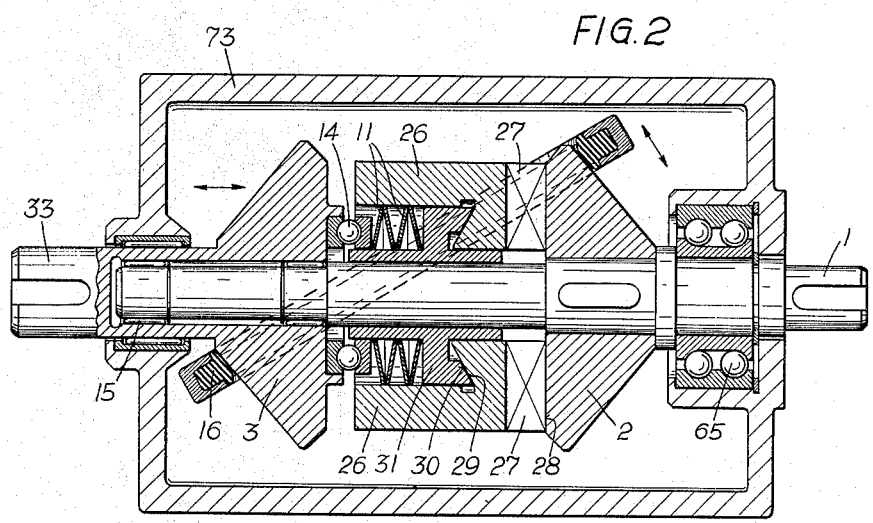
Figure 3:
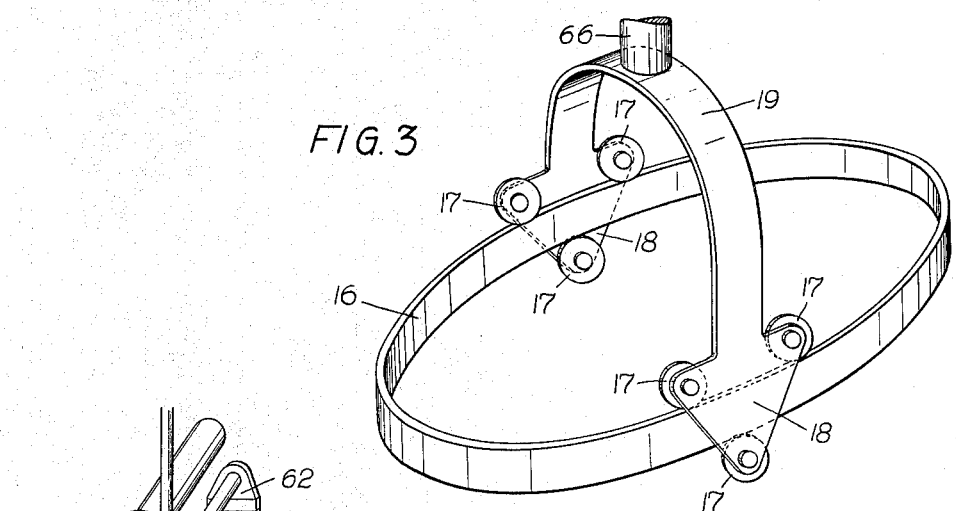
Figure 5:
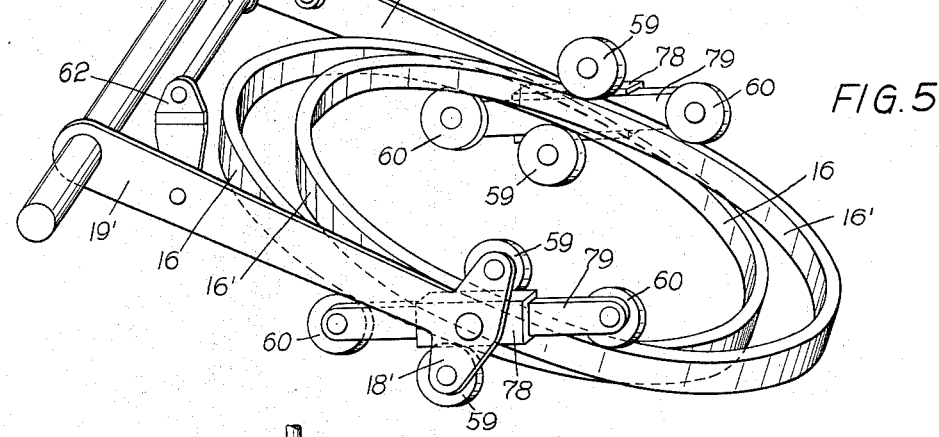
Figure 4:
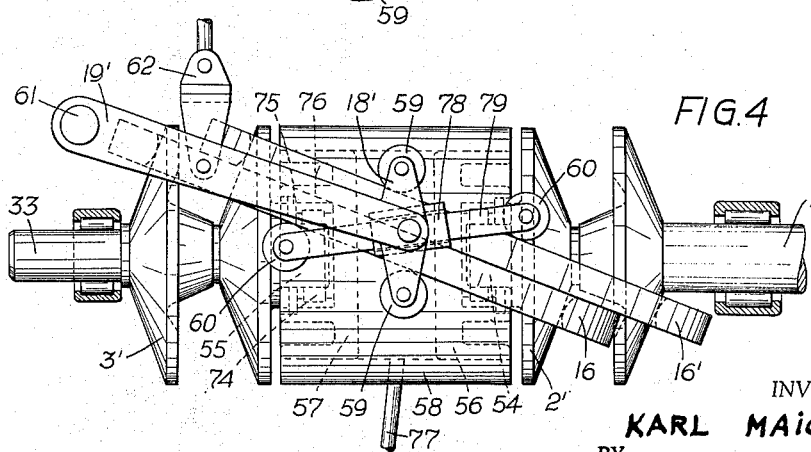
Figure 6:
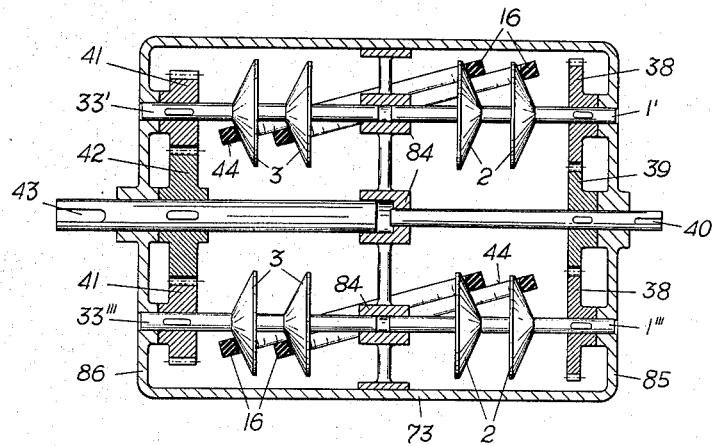
Figure 7:
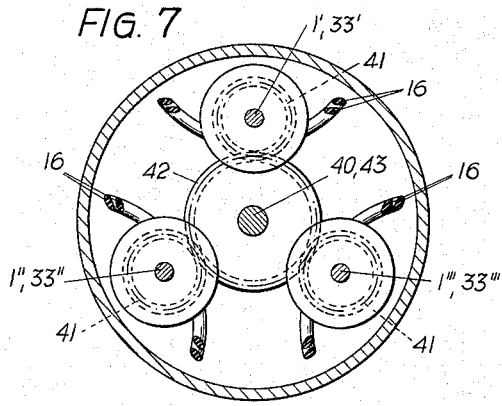
Figure 8:
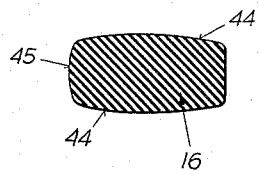
Figure 9:
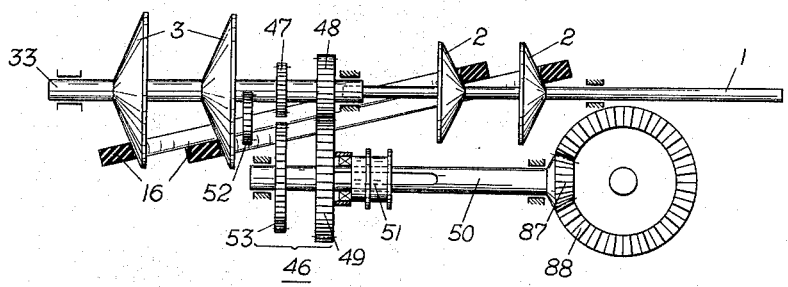

Several illustrative embodiments of the friction gearing according to the invention are diagrammatically shown on the drawing. FIGS. 1 and 2 are axial longitudinal sectional views showing gearings with rotors supported by hydraulic and mechanical means, respectively. FIG. 3 is a perspective view showing the rolling contact member of FIG. 1. FIG. 4 is a side elevation showing a third embodiment of the gearing. FIG. 5 is a perspective view showing the rolling contact member of FIG. 4. FIG. 6 shows a further embodiment of the gearing comprising a plurality of cone wheel combinations. FIG. 7 is a transverse sectional view of the gearing of FIG. 6. FIG. 8 is a transverse sectional view showing a rolling contact ring and FIG. 9 shows another embodiment of the gearing for forward and reverse motions.

The friction gearing shown in FIG. 1 comprises two conical rotors 2, 3, which are carried by the driving shaft 1 and the small ends of which face away from each other. The rotor 2 is keyed to the shaft 1 and at its end facing the rotor 3 has a sleevelike extension 4, which is gripped between two hollow cylinders 5 and 6, which are closed at one end each and lie one in the other. The hollow cylinder 5 has a rim 8, which protrudes beyond the bottom 7 of the cylinder 5 and bears on the bottom 9 of the hollow cylinder 6 to define a chamber 10 for accommodating a liquid cushion. The hollow cylinder 5 accommodates a set of plate springs 11, which are grouped around the driving shaft 1 and are gripped between the bottom 7 of the cylinder 5 and a sleeve 13 engaging the shoulder 12 of the shaft 1. The hollow cylinder 6 bears by means of a radial bearing 14 on the rotor 3, the bore 63 of which accommodates needle bearings 15, by which the rotor 3 is displaceably and rotatably mounted on the shaft 1. The axial displacement of the rotor 3 is possible only within a small extent to provide for the required contact pressure between the rotors and the ring 16, which will be described hereinafter. The rotor 3 is held against outwardly slipping from the shaft 1 by a bearing 64, which is fitted on the shaft and inserted in a housing, not shown, which accommodates the gearing. This housing accommodates also the bearing 65, which forms the second support for the shaft 1.

The rotors 2, 3 are surrounded by a ring 16, which serves as a rolling contact member and which is guided between rollers 17 at two diametrically opposite points. As is shown in FIG. 3, the present embodiment comprises a fork 19 provided at each of its two free ends with three rollers 17 disposed at the corners of a triangular plate 18. The fork 19 is axially displaceable by means of a piston rod 66 connected to a hydraulic piston 20. For this purpose, the hydraulic cylinder 67 is provided at each of its two ends with an opening 68 and 69, respectively, which openings can be connected to the corresponding pressure or return conduit of a pump system, not shown, depending on the desired displacement of the piston 20 in one direction or the other.

The ring 16 may be designed in any desired manner, for instance, with a slightly crowned bearing surface 70.

Nozzles 22 are provided adjacent to the points of contact between the ring 16 and the rotors 2, 3. A cooling liquid can be sprayed through these nozzles onto the surfaces in rolling contact. As distinguished from the position shown, the nozzles 22 may be turned through 90° into the plane of the ring to extend tangentially to the points of contact between the ring 16 and the rotors 2, 3.

The rotary motion is transmitted from the rotor 3 by a helical gear 23, which is integrally connected to the rotor 3 by means of the hub 71.

The chamber 10 between the bottoms 7, 9 of the cylinders 5, 6 communicates with the above-mentioned pump installation by an axial duct 24 in the shaft 1 and a check valve, not shown. The chamber 10 communicates with the duct 24 through the radial duct 72. The chamber 10 is constantly filled with liquid under pressure through said ducts 24 and 72. This liquid under pressure causes the cylinders 5 and 6 to be moved apart so that the rotors 2, 3 are forced against the ring 16. To seal the liquid flow paths, sealing rings 25 are provided between the sleevelike part 4 and the cylinders 5, 6, on the one hand, and between the cylinders and the shaft 1, on the other hand. A gas may be used instead of a liquid.

The described gearing operates as follows: The driving shaft 1 rotates the conical rotor 2. This drives the ring 16, which rotates the rotor 3. The plate springs 11 and the pressure of the liquid in the chamber 10 provide for a sufficient contact pressure between the rotors 2, 3 and the ring 16. By an element which produces a reaction pressure, e.g., the helical teeth on the output wheel 23, the contact pressure may be increased further. To vary the transmission ratio, the ring 16 is displaced by the piston 20 in the direction of its axis. The ring 16 may also be displaced in the radial direction between the rollers 17. By this parallel adjustment resulting from the axial and radial displacements, the ring 16 on the rotor 2 is caused to engage the conical rotor 2 on an annular path smaller in diameter and to engage the conical rotor 3 on an annular path larger in diameter, or vice versa.

The pressure of the liquid in the chamber 10 is increased with the power being transmitted.

In the illustrative embodiment of the gearing shown in FIG. 2, the conditions are similar to those described hereinbefore with the difference that the liquid cushion in the chamber 10 is replaced by centrifugal weights 26, which are displaceably mounted by means of the sliding blocks 27 in radial grooves 28 of the rotor 2 coupled to the driving shaft 1. The centrifugal weights 26 have a bevel 29, which is engaged by a mating bevel 30 of a pressure member 31, which is supported by the rotor 3 by means of the plate springs 11 and the radial bearing 14.

An increase in the velocity causes the centrifugal weights 26 to move outwardly and by means of the pressure member 31 to compress the springs 11 and thus to increase the contact pressure on the contact surfaces between the rotors 2, 3 and the ring 16. The driven shaft 33 is integral with the rotor 3. As in the illustrative embodiment shown in FIG. 1, the adjustment of the ring may be effected hydraulically.

The housing, which has only been mentioned in the gearing according to FIG. 1, is indicated at 73 in the illustrative embodiment shown in FIG. 2.

The frictional gearing shown in FIG. 4 comprises two rotors 2', 3', each of which consists of a double cone. The rotor 2' is connected to the driving shaft 1 and the other cone 3' is connected to the driven shaft 33 or, as is indicated in the drawing, integral with it. At their ends facing each other, both rotors 2', 3' are provided with a pin 54, 55 each, which is mounted by an anti-friction bearing 74 and a radial bearing 75 in a housinglike extension 76 of a plunger 56 or 57, respectively. The two plungers 56 and 57 are accommodated in a stationary housing 58, which is connected to a pressure oil line 77.

The rotors 2', 3' are surrounded by two rolling contact members consisting of rings 16, 16', which are guided between two pairs of rollers 59, 60 at two substantially diametrically opposite points and have mutually offset axes of rotation. The top rollers 59, 60 engage ring 16', while the bottom rollers 59, 60 engage ring 16. Each of these rings contacts an inner rolling contact surface of one rotor and on an outer rolling contact surface of another rotor.

As is shown in FIG. 5, the pairs of rollers 59, 60 are arranged to be relatively adjustable. For this purpose, the substantially superimposed pair of rollers 59, which surround the pair of rings 16, 16' are mounted in a carrier 18', which corresponds to the plate 18 and is provided with a guide slot 78 for receiving the sliding block 79. The pair of rollers 60 are mounted at the end of the sliding block 79 and support the pair of rings 16, 16' on both sides of the pair of rollers 59 at points which are upwardly and downwardly spaced below the same. Each of the two carriers has pivoted to it an arm 19', the free end of which is rotatably mounted in a stationary part 61. The two arms 19' with the shaft 61 correspond to the fork 19 shown in FIG. 3 and are connected by links 62 to a lifting gear, not shown.

The described gearing operates as follows: The driving shaft 1 rotates the conical rotor 2'. This drives the rings 16, 16', which rotate the double cone 3'. The pressure of the liquid between the plungers 56, 57 ensures an adequate contact pressure between the rotors 2', 3' and the rings 16, 16'. To vary the transmission ratio, the rings 16, 16' are displaced by the lifting gear on the rolling contact surfaces of the rotors 2', 3' along the generatrices of the cones to contact the conical rotors on other parallel circles. Owing to the pivoted mounting of the carriers 18' on the arms 19' and the displaceable mounting of the sliding block 79 in the groove 78 of each carrier 18', the pairs of rollers 59, 60 can adjust themselves to any position of the rings 16, 16'.

The lifting gear may be adjusted in any desired manner, e.g., electrically, hydraulically or pneumatically or by hand.

FIGS. 6, 7 show three gearings according to the invention, which are coupled in a starlike arrangement.

The driving and driven shafts in this arrangement are not parallel, but coaxial, as in the embodiments shown in FIGS. 1 to 3. Both the driving and driven shafts are divided into three part shafts 1', 1'', 1''' and 33', 33'', 33''', respectively, the axes of which are equally angularly spaced on a common circle. The mutually facing ends of each pair of coaxially associated part shafts 1', 33'; 1'', 33'' and 1''', 33''', respectively, are accommodated in a common bearing 84, which is carried by the housing 73. The outer ends of the part shafts 1', 1'', 1''' and 33', 33'', 33''' are mounted in the end walls 85 and 86 of the housing 73.

The driving part shafts 1', 1'', 1''' are connected by gears 38 and 39 to a common input shaft 40. The driven part shafts 33', 33'', 33''' are coupled by gears 41 and 42 to a common output shaft 43. In this design, the rings 16 which surround the driving rotors 2 and the driven rotors 3 engage each other with their side faces 44. A ring profile which is suitable for this purpose is shown in a transverse sectional view in FIG. 8. It is apparent that the side faces serving as bearing faces and the rolling contact face 45 of the ring 16 are curved.

In the gearing shown in FIG. 9, the driving shaft 1 is concentric with the driven shaft 33. Both shafts are provided with two conical rotors 2 and 3, respectively. The rotors 2 of the driving shaft 1 are smaller than those of the driven shaft 33. The rings 16 surrounding the rotors assume a position similar to that in the gearing shown in FIG. 4 or FIG. 6. Adjacent to the driven shaft 33, a spur gear train 46 provided between the two rotor pairs 2, 3 can effect a speed reduction and a reversal of the direction of rotation. For this purpose, the gearing comprises two gears 47, 48, which are secured to the shaft 33 and of which the gear 48 is in mesh with a gear 49, which is freely rotatably mounted on the output shaft 50 and can be connected to it for joint rotation by a clutch 51. The clutch 51 is axially displaceable and by transmitting elements not shown is connected to an idler 52, which can be caused to mesh with the gear 47 and a gear 53 disposed opposite to the idler and secured to the shaft 50. The described gearing is mainly contemplated for motor vehicles and machine tools in which forward and reverse motions are required. In the position shown, the clutch 51 connects the gear 49 to the shaft 50 so that the forward motion is engaged, while the gear 52 is out of mesh with the gears 47 and 53. To shift to a reverse motion, the clutch 51 is displaced to the right, whereby the gear 52 is caused to mesh with the gears 47 and 53 and the gear 49 is uncoupled from the shaft 50. The motion of the shaft 50 is transmitted by bevel wheels 87, 88 to the member to be driven.

Various modifications in design are possible within the scope of the invention. For instance, a sliding finger arrangement may be used instead of the roller guides for guiding the friction rings.

What is claimed is:

1. An infinitely variable friction gearing comprising at least one driving shaft, at least one substantially conical rotor having a straight generatrix secured to said driving shaft for rotation therewith, an associated driven shaft coaxial with each driving shaft and also having at least one substantially conical rotor with a straight generatrix secured thereto, each rotor on a driving shaft tapering in a direction opposite to the taper of each rotor on its associated driven shaft, an endless ring-shaped, rolling contact member surrounding and frictionally engaging the tapered surfaces of each pair of rotors on associated driving and driven shafts, and means for adjustably displacing each said rolling contact member along said tapered surfaces to parallel positions for changing the speed of the gearing.

2. A gearing as set forth in claim 1, wherein is additionally provided means for forcing each said pair of rotors against its rolling contact member.

3. A gearing as set forth in claim 2, wherein said means for forcing each said pair of rotors against its rolling contact member comprises a hydraulic cylinder having opposed pistons, the conical rotors of at least one of said pairs being mounted with their bases facing each other and secured to said pistons to provide for an axial adjustment of at least one of the rotors.

4. A gearing as set forth in claim 1, wherein said rolling contact members of ring shape are mounted at two opposite points between rolls which support the rings on both sides, said rolls being carried by arms of a lifting gear.

5. A gearing as set forth in claim 4, wherein at each side of each rolling contact member an opposed pair of said rolls are rotatably mounted in fixed arms and a second pair of said rolls are rotatably mounted in arms slideable with respect to said fixed arms.

6. A gearing as set forth in claim 1, wherein is provided a plurality of driving and driven shafts, all of said driving shafts being coupled together and all of said driven shafts being coupled together to form a gear block.

References Cited by the Examiner

UNITED STATES PATENTS

| | | | |
|---|---|---|---|
| 358,133 | 2/1887 | Vivo | 74—191 |
| 657,516 | 9/1900 | Coleman | 74—192 |
| 691,789 | 1/1902 | Mann | 74—192 |
| 826,969 | 7/1906 | Stephan | 74—689 |
| 2,089,295 | 8/1937 | Pollard | 74—192 |
| 3,043,149 | 7/1962 | Davin et al. | 74—192 |

FOREIGN PATENTS

| | | |
|---|---|---|
| 859,023 | 5/1940 | France. |
| 362,639 | 8/1938 | Italy. |

DON A. WAITE, *Primary Examiner.*

BROUGHTON G. DURHAM, *Examiner.*